United States Patent
Horner-Richardson et al.

[11] Patent Number: 5,219,516
[45] Date of Patent: Jun. 15, 1993

[54] THERMIONIC GENERATOR MODULE WITH HEAT PIPES

[75] Inventors: Kevin Horner-Richardson, Lancaster; Donald M. Ernst, Leola, both of Pa.

[73] Assignee: Thermacore, Inc., Lancaster, Pa.

[21] Appl. No.: 899,273

[22] Filed: Jun. 16, 1992

[51] Int. Cl.⁵ .................................... G21D 7/00
[52] U.S. Cl. ................................. 376/321; 376/367
[58] Field of Search ................. 376/321, 367, 904; 136/202, 253; 310/301, 306; 976/DIG. 311, DIG. 284; 165/32, 10

[56] References Cited

U.S. PATENT DOCUMENTS

| | | | |
|---|---|---|---|
| 3,269,873 | 8/1966 | Dent | 136/208 |
| 3,601,638 | 8/1971 | Busse | 310/4 |
| 3,613,773 | 12/1971 | Hall | 165/32 |
| 3,666,566 | 5/1972 | Paine | 136/202 |
| 3,672,443 | 6/1972 | Bienert et al. | 136/202 |
| 3,702,408 | 11/1972 | Longsderff et al. | 310/4 |
| 3,709,781 | 1/1973 | Fiebelmann et al. | 376/321 |
| 3,801,446 | 4/1974 | Sparber et al. | 136/202 |
| 3,897,271 | 7/1975 | Kim | 136/202 |
| 3,931,532 | 1/1976 | Byrd | 136/202 |
| 3,979,226 | 9/1976 | Renner et al. | 136/208 |
| 4,020,368 | 4/1977 | Carney | 136/208 |
| 4,056,406 | 11/1977 | Markman et al. | 136/208 |
| 4,095,998 | 6/1978 | Hanson | 136/208 |
| 4,293,837 | 10/1981 | Jaffe et al. | 338/32 H |
| 4,506,183 | 3/1985 | Morris | 310/306 |
| 4,755,350 | 7/1988 | Kennel | 136/202 |
| 4,857,421 | 8/1989 | Ernst | 429/104 |

OTHER PUBLICATIONS

A Nuclear Thermionic Space Power Concept Using Rod Control and Heat Pipes by Anderson Nuclear Applications vol. 5 Dec. 1968 No. 6. pp. (424–436).

Primary Examiner—Donald P. Walsh
Assistant Examiner—Meena Chelliah
Attorney, Agent, or Firm—Martin Fruitman

[57] ABSTRACT

A thermionic electric converter module integrated with heating and cooling heat pipes. Two heat pipes are arranged concentrically, with the annular emitter heat pipe on the outside of the module to isothermally distribute heat from a source located in any direction around the unit to the emitter located on the inside exterior wall of the heat pipe. The exterior wall surface of the collector heat pipe, located inside the annular emitter heat pipe, is separated from the emitter by the thermionic converter's interelectrode gap and serves as the collector of the thermionic converter. The collector heat pipe is of conventional cylindrical configuration and transports the waste heat of the thermionic converter along the unit's axis to a remote location for disposal.

10 Claims, 3 Drawing Sheets

THERMIONIC GENERATOR MODULE WITH HEAT PIPES

SUMMARY OF THE INVENTION

This invention deals generally with thermionic electric generators when a thermionic generator is defined as a collection or assembly of thermionic converters, devices or cells, and more specifically with a thermionic energy converter which uses heat pipes to furnish the heat to the thermionic cell and to remove heat from the thermionic cell.

Thermionic energy converters are generally acknowledged to be very satisfactory compliments to nuclear heat sources, since thermionic converters can convert heat directly to electricity silently, without moving parts, and at reasonable efficiencies at temperatures which are generally available from radiation cooled nuclear reactors. However, since the configuration of a radiation cooled reactor core is generally required to be tightly packed, the configurations of thermionic converters forming thermionic generators for such use has been somewhat of a problem.

The structure of thermionic generators is further complicated by the fact that, not only must heat be delivered to the individual thermionic converter emitter, but waste heat must also be removed from the collector of the individual thermionic converter. Since radiation cooled reactor cores are generally shaped as enclosed cylinders, or at least as closed boxes, and access to the interior of such cores has been difficult, thermionic generators have typically taken on configurations which surround such cores. This has lead to such configurations as pancake structures and annular jackets around the reactor core.

Essentially, the typical thermionic generator configuration surrounds the reactor core, but that places certain constraints on the individual thermionic converter which limits the overall power generating capability. For instance, for any given size of a reactor core, the surrounding surface has a predetermined area, and therefore a simple jacket configuration thermionic generator built around such a core will have a limited surface area available for the heated emitters of the individual thermionic converters. Such emitters are typically located on the thermionic converter surface closest to the reactor core so that they will be subjected to the highest temperature. Also, the collector of the thermionic converter, which must be spaced away from the emitter by only a very small vacuum space, has approximately the same surface area as the emitter, and that may limit the removal of heat from the collector.

Until now, as long as a thermionic generator was built to essentially enclose the reactor core, it has been accepted that the area of the emitter would be approximately limited to no more than the outside surface area of the core itself, and therefore the power generating capability of the thermionic generator would be limited by the size of the reactor core.

The present invention overcomes that surface area limitation for thermionic generators which enclose a reactor core. The present invention uses multiple thermionic converter modules to dramatically increase the emitter surface area available for any given reactor core size. Moreover, each thermionic converter module effectively delivers reactor heat to the entire emitter surface area, and also furnishes additional collector surface area which permits easy removal of the excess heat from the thermionic converter collector. Furthermore, because of the use of an optimized number of individual modules rather than a greater number of planar thermionic converters, the reliability of the assembly is greatly enhanced, since there are fewer converters which can be affected by the statistical failure rate.

These benefits are attained by the use of a thermionic converter module constructed with two heat pipes. In the preferred embodiment, the first heat pipe is constructed in an annular configuration and is located around at least a portion of the exterior surface of the conventional cylindrical casing of the second heat pipe.

The innermost surface of the first heat pipe, the outer annular emitter heat pipe, and the outermost surface of the second heat pipe, the cylindrical collector heat pipe, are separated by only a small spacing.

This spacing is closed off at its ends, near the ends of the outer emitter heat pipe, and the space between the heat pipes is evacuated and made into a vacuum enclosure, with the space forming the interelectrode gap of a thermionic converter. The outside surface of the internal collector heat pipe is constructed of a material suitable for a thermionic converter collector, and the innermost surface of the external emitter heat pipe is constructed of a material suitable for the emitter of a thermionic converter. Thus, they form an emitter and collector, and, along with the interelectrode gap between them, they constitute a thermionic converter which is located between the two heat pipes.

The inner collector heat pipe is of conventional elongated cylindrical configuration, so that heat furnished to any portion of its casing's exterior surface is transported axially along the heat pipe, and can be removed from any other portion of the exterior surface of the casing. It would be possible to substitute other cooling means for this collector heat pipe, but there might be some degradation of cooling.

The thermionic generator of the present invention has characteristics which are quite different from the typical thermionic generator which is used to jacket a reactor core. A major benefit of the present invention is the increase in available emitter surface. While the prior art type thermionic generators were limited to the surface area available on the outside surface of the reactor core, the present invention can easily double that amount of surface.

When a large number of cylindrical modules of the present invention are used to surround a core, each module has approximately one half of its outermost surface subjected to the heat of the core. Nevertheless, because of the isothermal heat transfer characteristic of the annular emitter heat pipe, the heat from that one heated side of the heat pipe is transferred to the entire innermost emitter surface. The module acts as if it were completely immersed in the heat source, and its emitter were being heated by a source with access to the entire emitter surface.

Although it is less practical to construct, a heat pipe and thermionic converter module which would approach a square cross section would theoretically increase the emitter surface area available by a factor of four over a planar thermionic converter which merely has its emitter facing the core. Similarly, a rectangular cross section module with a smaller side subjected to the heat of the core could increase the available emitter surface even more.

However, the benefit of an emitter heat pipe is not limited to these unusual configurations of thermionic converter modules. An emitter heat pipe will, in fact, increase the output of a thermionic converter regardless of the converter's configuration. This benefit is the result of the isothermal heating of the entire emitter when a heat pipe is used.

Another advantage of the present invention is the ease with which heat can be removed from the collector of the thermionic converter. Since the entire collector of the thermionic converter of the invention is actually on the surface of a heat pipe casing, heat from the collector is removed by the integrated internal heat pipe, and that heat can be delivered to virtually any location or heat removal means. In the preferred embodiment, the collector heat pipe extends axially beyond the ends of the emitter heat pipe and the reactor core, and the collector heat pipe is interconnected with a heat removal means such as a group of radiation cooling fins.

The present invention therefore furnishes a thermionic converter module which produces higher power because a larger emitter surface area can be heated and be heated more effectively. At the same time, the thermionic converter module easily disposes of the additional waste heat produced as a result of the higher power operation.

DETAILED DESCRIPTION OF THE INVENTION

Figure 1:
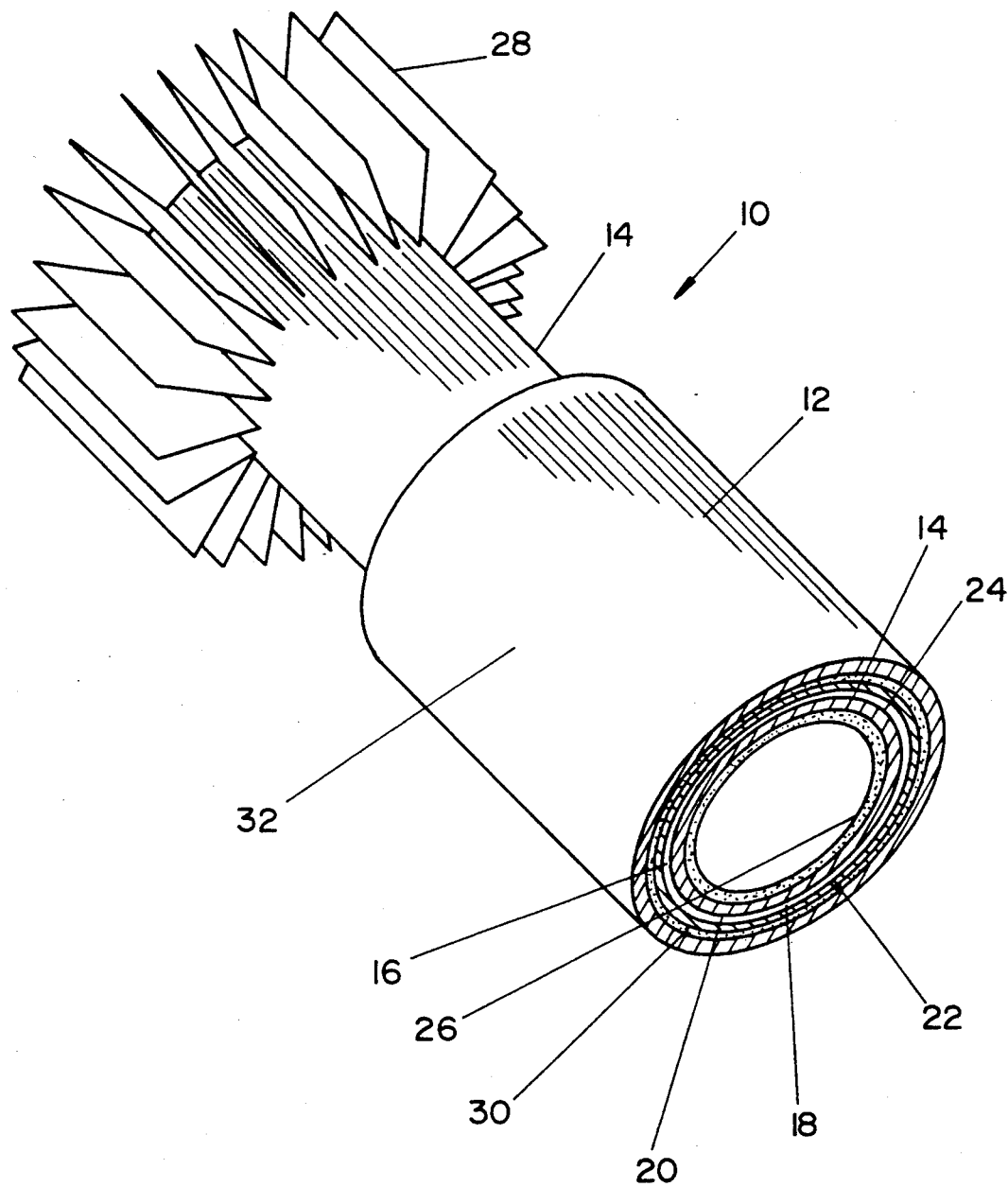
FIG. 1 is a perspective view of the preferred embodiment of the thermionic converter module of the invention shown with one end in cross section to view the internal structure.

FIG. 1 is a perspective view of the integrated heat pipes and thermionic converter of the preferred embodiment of the invention in which thermionic converter module 10 is constructed of external emitter heat pipe 12, internal collector heat pipe 14 and thermionic converter 16 which separates the two heat pipes.

Thermionic converter 16 is of conventional construction for such a device, and is essentially comprised of interelectrode space 18, collector surface 20 and emitter surface 22. Those skilled in the art of thermionic converters will understand that such thermionic converters also include spacers to accurately maintain the interelectrode space, structures to maintain axial alignment of the collector and emitter, and devices to seal off the interelectrode space and produce a suitable vacuum within it, but such devices are not shown because, for the purposes of understanding this invention, they are not important.

The present invention essentially involves the construction of thermionic converter 16 so that both emitter 22 and collector 20 are formed upon or directly adjacent to surfaces of the casings of heat pipes.

Collector 20 is formed upon collector heat pipe 14 which, in the preferred embodiment shown in FIG. 1, is of conventional cylindrical configuration. In the region of emitter heat pipe 12, the outermost surface of casing 24 of collector heat pipe 14 is coated with, or constructed of, a material suitable for a thermionic converter collector. Internally, collector heat pipe 14 is of conventional construction. It is shown in FIG. 1 with internal wick 26 in contact with the interior surface of casing 24, but it may be constructed with any other known features of a heat pipe, such as arteries or capillary grooves. The significance of collector heat pipe 14 is that while its outermost surface operates as collector 20 of thermionic converter 16, its heat pipe function is able to cool collector 20 and move the heat from collector 20 to a remote cooling means such as cooling fins 28. Moreover, since collector heat pipe 14 is constructed of electrically conductive materials, it also serves as an electrical connection to collector 20.

On the other side of interelectrode gap 18 from collector 20, the innermost surface of emitter heat pipe 12 is constructed to act as emitter 22 of thermionic converter 16 and is formed of a material suitable for that function. Emitter heat pipe 12 is constructed to surround collector heat pipe 14, and, in the preferred embodiment shown in FIG. 1, is therefore of annular configuration. The structure of emitter heat pipe 12 is similar to that of any thin, flat heat pipe, except that in this case the thin, flat structure is wrapped into an annular structure. The internal structure of emitter heat pipe 12 may include any structures, such as wick 30 or other capillary structures, which are suitable for heat pipe operation.

The particular function of emitter heat pipe 12 is to transfer heat applied to any portion of its outermost surface 32 to the entire surface of innermost emitter 22. Such a function is well within the capability of a properly designed heat pipe. Thus, even when a radiant heat source such as a nuclear reactor core is located so that it affects only the portion of outermost surface 32 of emitter heat pipe 12 which is visible in FIG. 1, nevertheless, all of emitter 22 will be heated to virtually the same temperature because of the isothermal heat transfer capability of emitter heat pipe 12. In the preferred embodiment structure pictured in FIG. 1, the action of emitter heat pipe 12 effectively heats approximately twice as large an emitter surface as is actually subjected to the radiant heat of a heat source located on only one side of thermionic converter module 10.

Figure 2:
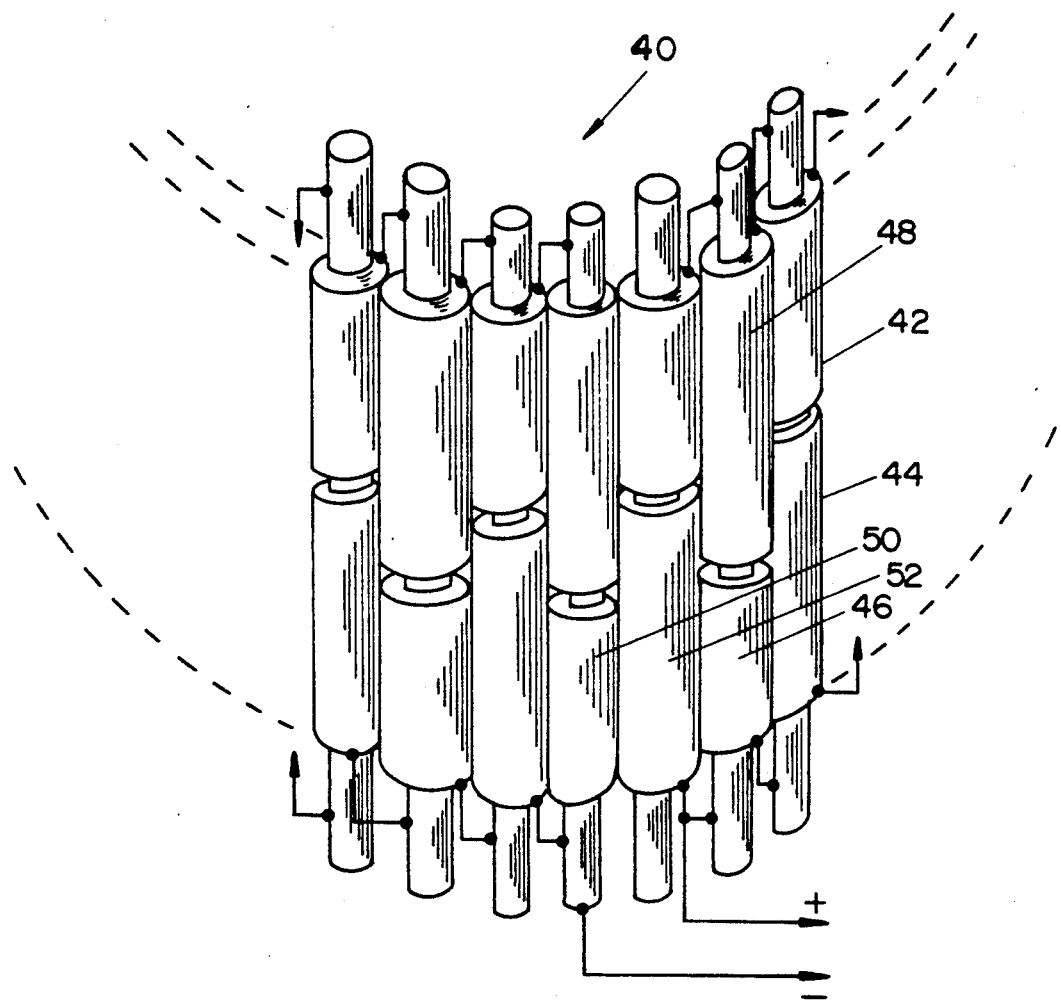
FIG. 2 is a simplified drawing of a part of a heat source jacket constructed with stacks formed of several modules of the preferred embodiment.

FIG. 2 is a simplified diagram of part of a structure within which thermionic converter modules such as module 10 pictured in FIG. 1 may be utilized. FIG. 2 depicts a portion 40 of a jacket, indicated by dashed lines, which surrounds a nuclear reactor core, and is formed of thermionic converter modules such as 42, 44, 46, and 48 which are grouped into axial stacks such as stack 43 formed by modules 42 and 44. Such stacks can be comprised of any number of two or more modules.

One particular feature of the configuration of jacket 40 as pictured in FIG. 2 is that the thermionic converter modules in a stack are not all of the same length. Thus, while all the stacks of modules oriented end to end are parallel to the axis of jacket 40, as are modules 42 and 44, and each stack of modules has a total length the same as all the other stacks, the modules themselves do not all have the same length. This causes the location of the junctions of the ends of the modules within each group to vary in location relative to the junctions of the adjacent groups of modules. This configuration prevents the end discontinuities in heat transfer resulting from the effects at the end of a heat pipe from being cumulative and significantly affecting the operation of the core.

As also shown in FIG. 2, the module of the preferred embodiment may also used to advantage as an electrical feed for the entire generator circuit. Module stacks 50 and 52 are shown in such use with their electrical connections, and those for all the other modules, shown in schematic form.

Essentially, the several modules are connected in a series configuration with the emitter of one module connected to the collector of an adjacent module. Since it is desirable to connect to the entire generator at one location, it is necessary to also interconnect the modules at the remote end of the groups to the external electrical feeds. Conventionally this would be done by electrical leads which replace some of the modules, but such a configuration would change the heat transfer characteristics of the jacket.

Therefore, as shown in FIG. 2, the present invention uses two modules, 50 and 52 to serve as interconnecting electrical connections. Module 50 serves as the negative lead and module 52 serves as the positive lead for the entire generator configuration. Although this reduces the contribution of those particular modules to the electrical output of the circuit, since there are many modules within the system, the sacrifice has very little effect on the electrical performance, while the configuration maintains intact the heat shielding and cooling heat transfer of the reactor core.

Figure 3:
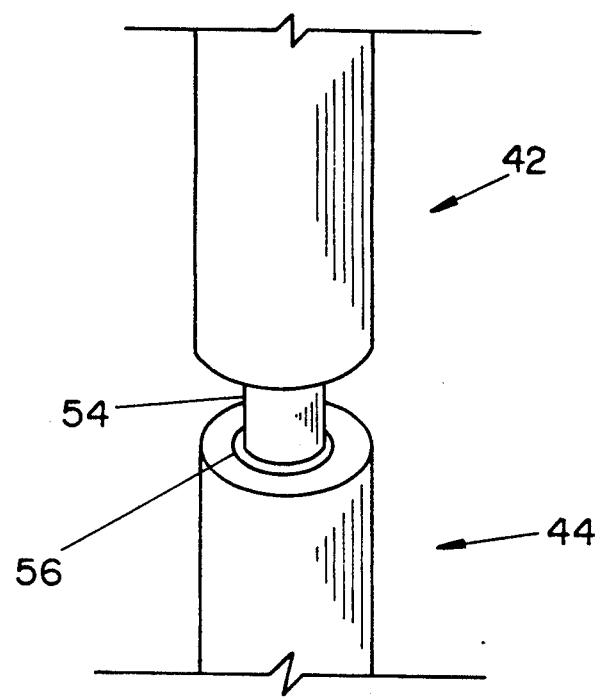
FIG. 3 is a perspective view of the region of a stack of modules which includes the junction between two thermionic converter modules.

FIG. 3 is a perspective view of that region of a stack of thermionic modules which includes a junction of two modules. When stacked together, module 42 and module 44 are actually constructed with a common collector heat pipe 54, but are both electrically insulated from that heat pipe by the use of a thermally conducting but electrically insulating member 56, visible only on module 44. A typical material for member 56, one which is a satisfactory heat conductor and electrical insulator, is sapphire, which can be coated directly upon the outside surface of common collector heat pipe 54. The collectors of the several thermionic emitters are then constructed upon the sapphire insulation which permits heat transfer to take place along the length of a stack with the all the thermionic converter collectors cooled by one continuous heat pipe. However, the individual thermionic converters in a stack can still be electrically connected in series to increase the voltage generated by a stack.

The thermionic converter module of the invention thereby furnishes a unit which can increase the electrical power output and improve the waste heat disposal system of a reactor core jacket, thus adding to the efficiency of electrical power generating systems based on thermionic generation.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, it is possible to use a single integrated module over the length of the entire reactor core, without stacking multiple modules end to end, or more than two modules could be used to form the stacks of modules. Moreover, an emitter heat pipe could be used on a thermionic converter even without the use of a collector heat pipe, and even when the thermionic converter is not associated with a radiation cooled nuclear reactor core.

What is claimed as new and for which Letters patent of the United States are desired to be secured is:

1. A thermionic converter module comprising:
    a first heat pipe with an annular casing which has a first surface located on an inside surface of the annular casing, at least part of the first surface of the casing of the first heat pipe having constructed upon it a thermionic converter emitter located so that heat will be transferred by conduction from the first heat pipe casing to the thermionic converter emitter;
    a second heat pipe with a casing which has a second surface, the second surface being located within the first surface of the annular casing of the first heat pipe so that it is surrounded by the first surface;
    a thermionic converter collector located so as to transfer heat by conduction to the second surface of the casing of the second heat pipe with the thermionic converter collector being adjacent to the thermionic converter emitter but being separated from the thermionic converter emitter by an interelectrode space; and
    end fitting structures located so that, with the thermionic converter collector and the thermionic converter emitter, they complete an enclosure around the interelectrode space and form an evacuated enclosure within which are located the thermionic converter collector and the thermionic converter emitter.

2. The thermionic converter module of claim 1 further including heat removal means acting upon the second heat pipe in a region other than the second surface to which the thermionic converter collector transfers heat.

3. The thermionic converter module of claim 1 wherein the second heat pipe is constructed in the form of a cylinder and the first heat pipe is constructed in the form of an annular structure around the cylinder of the second heat pipe.

4. A thermionic generator assembly comprising a plurality of modules arranged in a configuration adjacent to a heat source, each module comprising:
    a first heat pipe located to be radiated with heat from a heat source, the first heat pipe having an annular casing which has a first surface located on an inside surface of the annular casing, at least part of the first surface of the casing of the first heat pipe having constructed upon it a thermionic converter emitter located so that heat will be transferred by conduction from the first heat pipe casing to the thermionic converter emitter;
    a second heat pipe with a casing which has a second surface, the second surface being located within the first surface of the annular casing of the first heat pipe so that it is surrounded by the first surface;
    a thermionic converter collector located so as to transfer heat by conduction to the second surface of the casing of the second heat pipe, with the thermionic converter collector being adjacent to the thermionic converter emitter but being separated from the thermionic converter emitter by an interelectrode space; and
    end fitting structures located so that, with the thermionic converter collector and the thermionic converter emitter, they complete an enclosure around the interelectrode space and form an evacuated enclosure within which are located the thermionic converter collector and the thermionic converter emitter.

5. The thermionic generator assembly of claim 4 wherein thermionic converter modules are of lengths different from the length of the thermionic converter modules to which they are adjacent.

6. The thermionic generator assembly of claim 4 wherein at least one of the thermionic converter modules is used as an electrical connector to an external circuit.

7. The thermionic generator assembly of claim 4 wherein some modules are arranged end to end to form stacks of modules, and the thermionic converter collectors of the modules in a stack transfer heat to a common collector heat pipe.

8. The thermionic generator assembly of claim 4 wherein some modules are arranged end to end to form stacks of modules, the thermionic converter collectors of the modules in a stack transfer heat to a common collector heat pipe and the thermionic converter collectors are electrically insulated from the casing of the common collector heat pipe.

9. The thermionic generator assembly of claim 4 wherein the modules are cylinders.

10. A thermionic converter comprising:
an annular heat pipe with a casing, at least part of one inner surface of the casing of the heat pipe having constructed upon it a thermionic converter emitter located so that heat will be transferred by conduction from the heat pipe casing to the thermionic converter emitter;
a thermionic converter collector located adjacent to the thermionic converter emitter but being separated from the thermionic converter emitter by an interelectrode space, the collector being located within the annular casing of the heat pipe so that it is surrounded by the surface of the casing on which the emitter is constructed; and
end fitting structures located so that, with the thermionic converter collector and the thermionic converter emitter, they complete an enclosure around the interelectrode space and form an evacuated enclosure within which are located the thermionic converter collector and the thermionic converter emitter.

* * * * *